US008566065B2

(12) United States Patent
Fukuda et al.

(10) Patent No.: US 8,566,065 B2
(45) Date of Patent: Oct. 22, 2013

(54) APPARATUS, METHOD, PROGRAM, AND RECORDING MEDIUM FOR SUPPORTING ARRANGEMENT OF OPERATION AREAS LAYOUT

(75) Inventors: Yoshibumi Fukuda, Kasama (JP); Takeshi Yokota, Hitachi (JP); Hisanori Nonaka, Toride (JP); Norito Watanabe, Hitachi (JP); Toshiyuki Miyake, Hitachi (JP); Kenji Akagi, Hitachi (JP); Kensuke Morita, Hitachi (JP)

(73) Assignee: Hitachi-GE Nuclear Energy, Ltd., Ibaraki (JP)

( * ) Notice: Subject to any disclaimer, the term of this patent is extended or adjusted under 35 U.S.C. 154(b) by 449 days.

(21) Appl. No.: 12/844,949

(22) Filed: Jul. 28, 2010

(65) Prior Publication Data

US 2011/0029098 A1 Feb. 3, 2011

(30) Foreign Application Priority Data

Jul. 28, 2009 (JP) .................................. 2009-174927

(51) Int. Cl.
*G06F 17/50* (2006.01)
(52) U.S. Cl.
USPC .............................................................. 703/1
(58) Field of Classification Search
USPC .............................................................. 703/1
See application file for complete search history.

(56) References Cited

U.S. PATENT DOCUMENTS

| | | | |
|---|---|---|---|
| 5,873,251 A * | 2/1999 | Iino | 60/660 |
| 7,139,685 B2 * | 11/2006 | Bascle et al. | 703/1 |
| 7,496,411 B2 * | 2/2009 | Nakamura | 700/11 |
| 7,822,499 B2 * | 10/2010 | Nakamura | 700/97 |
| 8,095,346 B2 * | 1/2012 | Fukuda et al. | 703/6 |
| 8,155,928 B2 * | 4/2012 | Nonaka et al. | 703/1 |
| 2006/0074608 A1 * | 4/2006 | Clay et al. | 703/1 |
| 2006/0074609 A1 * | 4/2006 | Freeman et al. | 703/1 |
| 2009/0192772 A1 | 7/2009 | Fukuda et al. | |
| 2010/0114635 A1 * | 5/2010 | Watanabe et al. | 705/7 |

FOREIGN PATENT DOCUMENTS

| | | |
|---|---|---|
| JP | 6-187355 | 7/1994 |
| JP | 2000-202747 | 7/2000 |
| JP | 2001-142926 | 5/2001 |
| JP | 2001-249985 | 9/2001 |
| JP | 2001-356819 | 12/2001 |
| JP | 2003-140730 | 5/2003 |
| JP | 2008-217066 | 9/2008 |

* cited by examiner

*Primary Examiner* — Mary C Jacob
*Assistant Examiner* — Aniss Chad
(74) *Attorney, Agent, or Firm* — Antonelli, Terry, Stout & Kraus, LLP.

(57) ABSTRACT

An apparatus for supporting arrangement of operation areas layout includes: a storage unit that stores therein data on a position, a shape, and a use period of each operation area which has already been arranged in a prescribed site; a display control unit that references the data stored in the storage unit and makes a display unit display a top view illustrating arrangement of the operation areas at a given point of time on a temporal axis; and an operation areas layout arrangement processing unit that receives an input of a data on a position, a shape, and a use period of an operation area to be added into the prescribed site, references the data stored in the storage unit, and, if the received and added operation area is not determined to interfere with other already-arranged operation area, stores the data on the added operation area in the storage unit.

7 Claims, 13 Drawing Sheets

Flowchart of Processing of Rearrangement of Added Operation Area

Example of Configuration and Display of Output Screen

Example of Arrangement Specification of Added Operation Area

Example of Use Finish Date Specification of Added Operation Area

Example of Guidance Message Display in Case of Interference

Example of Interference State Detailed View Screen

Excluded Areas by Checking Dimension in x-axis Direction

Excluded Areas by Checking Dimension in y-axis Direction

Extracted Rectangular Areas

Example of Rearrangement Area Candidate Determination

Example of Rearrangement Area Manual Specification

Example 1 of Calculation of Carry-in Operation Time

Example 2 of Calculation of Carry-in Operation Time

Example 3 of Calculation of Carry-in Operation Time

Example 3 of Calculation of Carry-in Operation Time

Example 1 of Calculation of Travel Distance of Crane

Example 2 of Calculation of Travel Distance of Crane

APPARATUS, METHOD, PROGRAM, AND RECORDING MEDIUM FOR SUPPORTING ARRANGEMENT OF OPERATION AREAS LAYOUT

CROSS REFERENCE TO RELATED APPLICATIONS

This application claims the benefit of Japanese Patent Application No. 2009-174927 filed on Jul. 28, 2009, the disclosure of which is incorporated herein by reference.

BACKGROUND OF THE INVENTION

1. Field of the Invention

The present invention relates to designing and updating of a construction plan of a large-scale plant such as a nuclear power station, and, more specifically, to a technique of supporting arrangement of a layout of various types of operation areas which is required for a plant construction.

2. Description of the Related Art

Along with an increasing power demand, needs for constructing nuclear power stations have been growing all over the world. More and more numbers of operations for constructing the nuclear power stations have been thus implemented here and abroad. In constructing a large-scale plant such as a power station, various types of operations are performed in parallel such as ground preparation of a planned site, construction of a building, carry-in and installment of equipment, and piping. Those works are performed based on consensus of different operating bodies for construction, civil engineering, manufacturing, or the like, and under their respective directions.

Roughly speaking, such a large-scale plant construction undergoes three stages, namely, designing, procurement, and construction. Operations performed at the designing stage include designing of a plant building and an interior of the building, layout designing of equipment installed in the interior of the building, setting a carry-in procedure and a carry-in schedule, setting an area for temporarily placing machinery and equipment before being carried into a final position, setting a type or an operable range preferably a heavy machinery for carry-in, or the like. Those operations are performed based on examinations between the operating bodies. At the procurement stage, material, equipment, or the like which has been required at the designing stage are procured. Operations for the procurement are performed such that the material is carried in a construction site according to a prescribed carry-in schedule. And, at the construction stage, operations using heavy machinery or the like are performed based on the carry-in procedure set at the designing stage. The heavy machinery or the like operates within the operable range set at the designing stage so as not to cause interference with that of other operating body. It is thus important to draw up an efficient and highly accurate operation plan at the designing stage in order to reduce a design change at respective stages and facilitate an entire implementation of the operations. A person of experience usually creates such an operation plan at the designing stage. Recently, however, a less-experienced person is also required to create an efficient operation plan, because a rising demand of plant construction has increased the number of the plan designs.

In drawing up a plant construction plan for a nuclear power station or the like, a planner intends to maximize entire operation efficiency by coordinating plural conditions such as a carry-in procedure of equipment into a building and a type of heavy machinery used for the carry-in.

Conventional techniques available for drawing up such a plan disclose that a progress situation at a given point of an operation of a construction is displayed on a screen in three-dimensional graphics by associating data on an execution plan of the construction with data on a three-dimensional model of a structure or a member for the construction (see, for example: Japanese Laid-Open Patent Application, Publication No. 2001-249985; and Japanese Laid-Open Patent Application, Publication No. H06-187355). The conventional techniques are effective in checking up an operation concerning a plant to be constructed itself, because a progress of the construction is conveniently displayed on a screen in three-dimensional graphics using the data on a three-dimensional model of a structure or a member for the designed construction. The conventional techniques, however, fails to disclose arrangement of a layout of various operation areas required for a plant construction.

A work period required for completion of a large-scale plant construction is long. With a progress of the construction, an operation areas layout is usually subjected to reexamination where necessary. In response to this, for example, the work period is divided into plural subperiods. Diagrams of the operation areas layout for each of the subperiods are prepared. And, the operation areas layout is manually managed using the diagrams. Meanwhile, if an execution plan of the construction is changed and the operation areas layout requires reexamination, the operation areas layout should be appropriately changed without causing interference between operation areas, based on the plural diagrams. However, the conventional techniques have such problems that, because it is difficult to precisely know whether or not there is interference between the operation areas, an otherwise unnecessary measure has to be taken to deal with an interference which is found after an operation starts, or the construction plan has to be considerably revised.

SUMMARY OF THE INVENTION

The present invention has been made in an attempt to solve the above-mentioned problems and to prevent interference between operation areas from occurring in arranging an operation areas layout for designing and updating a plant construction plan.

An apparatus for supporting arrangement of operation areas layout supports an operation areas arrangement planning in which two or more operation areas having respective use periods and dimensions different from each other are arranged in a prescribed site. The apparatus for supporting arrangement of operation areas layout includes: a storage unit that stores therein data on a position, a shape, and a use period of each operation area which has been arranged in the prescribed site; a display control unit that references the data stored in the storage unit, makes a display unit display a top view illustrating arrangement of the operation areas at a given point of time on a temporal axis; and an operation areas layout arrangement processing unit that receives an input of a data on a position, a shape, and a use period of a first operation area which is to be additionally arranged in the prescribed site, references the data stored in the storage unit, and, if the operation areas layout arrangement processing unit determines that there is no interference of the first added operation area of which data has been received, with a second operation area which has been already arranged in the prescribed site, stores the data on the added operation area in the storage unit.

Other features and advantages of the present invention will become more apparent from the following detailed descrip-

DETAILED DESCRIPTION OF THE EXEMPLARY EMBODIMENTS

Next are described in detail exemplary embodiments for carrying out the present invention with reference to the related drawings.

Note that a prescribed place in which an operation area is arranged within a construction location is referred to as a "site".

A first embodiment describes an example in which an operation areas layout is rearranged using an evaluation indicator of a distance from a specified added operation area. A second embodiment describes an example in which an operation areas layout is rearranged using an evaluation indicator concerning a carry-in operation with use of a crane.

<First Embodiment>

Figure 1:
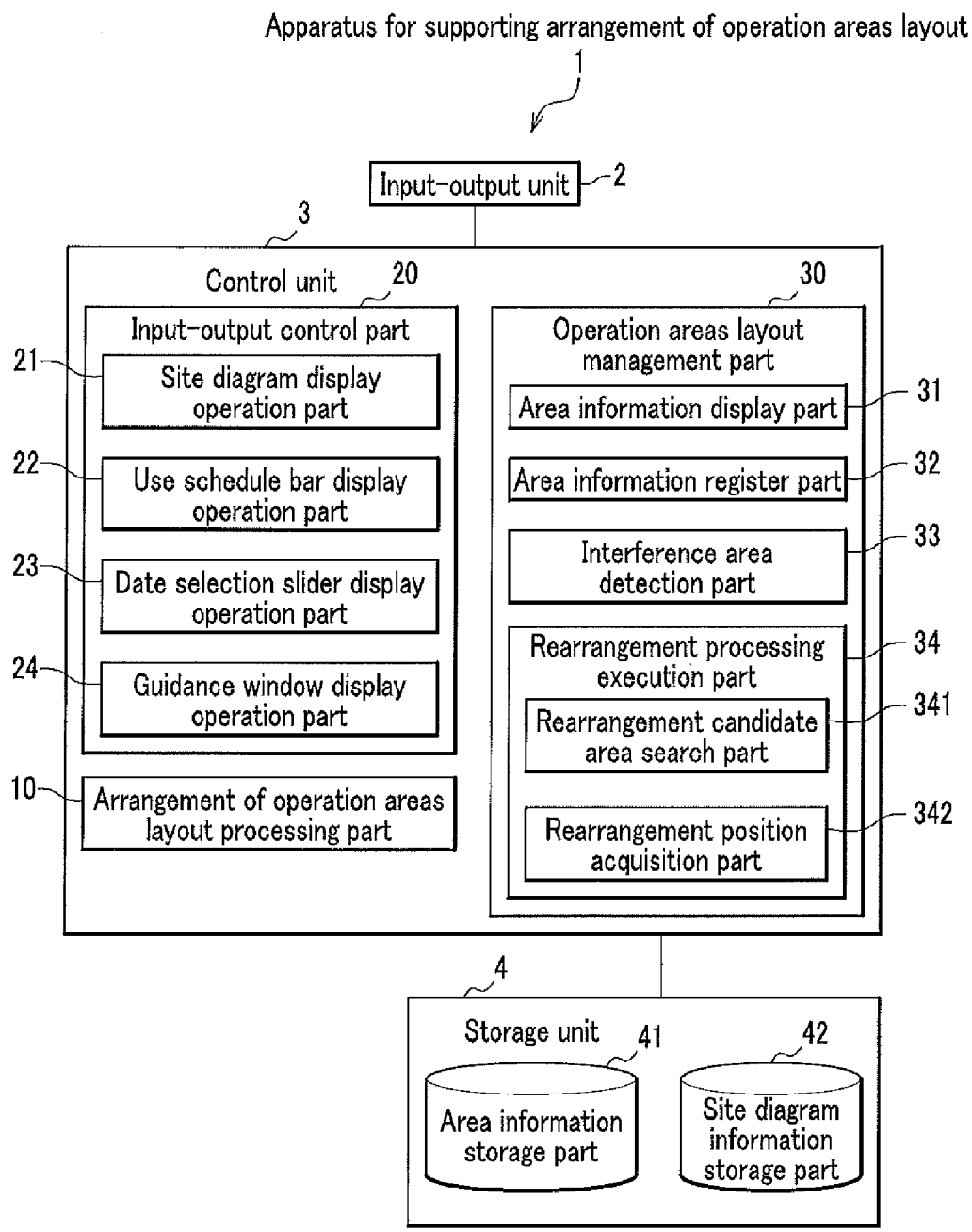
FIG. 1 is a functional block diagram illustrating a configuration of an apparatus for supporting arrangement of operation areas layout according to a first embodiment of the present invention.

FIG. 1 is a functional block diagram illustrating a configuration of an apparatus for supporting arrangement of operation areas layout 1 according to the first embodiment of the present invention. The apparatus for supporting arrangement of operation areas layout 1 is a computer configured to include an input-output unit 2, a control unit 3, and a storage unit 4.

The input-output unit 2 is configured by, for example, an input device such as a keyboard, a mouse, and a slider, as well as a display device such as a liquid crystal display. The control unit 3 makes a CPU (Central Processing Unit) not shown load and execute various programs recorded in a ROM (Read Only Memory), a hard disk, or the like not shown into a RAM (Random Access Memory) not shown, to thereby realize various functions of the apparatus for supporting arrangement of operation areas layout 1. The storage unit 4 is configured by a nonvolatile memory, a hard disk device, or the like and stores therein various types of data which are referenced and stored by the CPU.

The control unit 3 includes: an operation areas layout arrangement processing part 10; an input-output control part 20; and an operation areas layout management part 30. The input-output control part 20 has respective functions realized by a site diagram display operation part 21, a use schedule bar display operation part 22, a date selection slider display operation part 23, and a guidance window display operation part 24. The operation areas layout management part 30 has respective functions realized by an area information display part 31, an area information register part 32, an interference area detection part 33, and a rearrangement processing execution part 34. The rearrangement processing execution part 34 includes a rearrangement candidate area search part 341 and a rearrangement position acquisition part 342. The storage unit 4 includes an area information storage part 41 and a site diagram information storage part 42.

The operation areas layout arrangement processing part 10 manages an entire processing of arrangement of an operation areas layout into a site, which is to be described in detail hereinafter.

Figure 5:
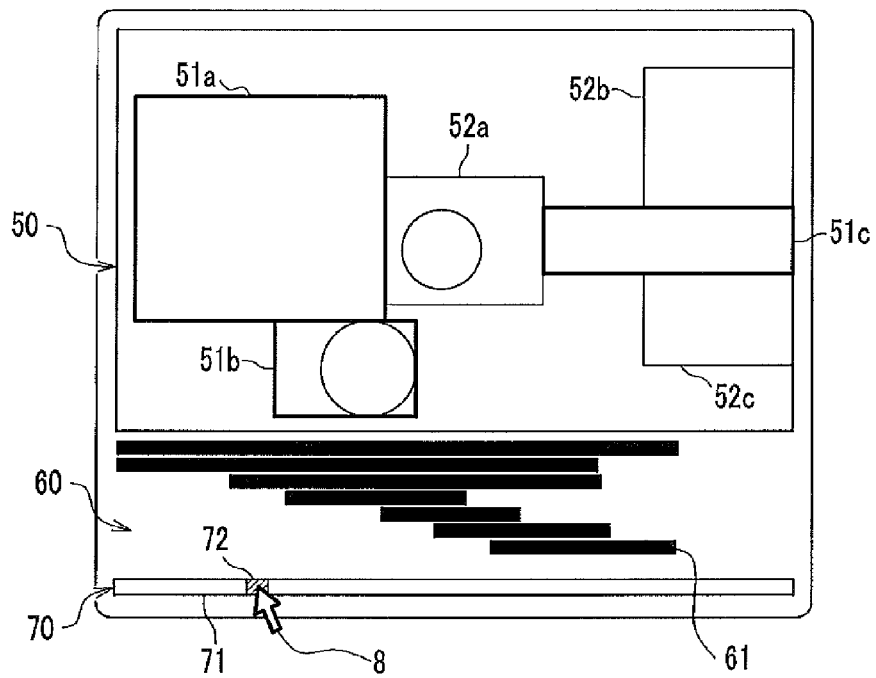
FIG. 5 is an example of a configuration and a display of an output screen of the apparatus for supporting arrangement of operation areas layout according to the first embodiment.

The input-output control part 20 makes the display device constituting the input-output unit 2 display an output screen. The input-output control part 20 also receives an input from the input device and updates the output screen. As shown in FIG. 5, an output screen which the input-output control part 20 makes the display device display includes, as major components: a site diagram 50; a use schedule view 60; and a date selection slider 70.

The site diagram 50 displays, with a top view, an arrangement of operation areas in a site on a date selected by the date selection slider 70. The operation part 21 controls a display and an operation of the site diagram 50. In FIG. 5, the site diagram 50 displays fixed areas 51a, 51b, 51c which are each a building, a passage, or the like present in the site, and operation areas 52a, 52b, 52c which are in use on that date. The site other than those areas is not in use. The site diagram display operation part 21 adds an operation area read from the area information storage part 41 and having already been arranged on the site, to diagram data of the entire site read from the site diagram information storage part 42. This creates the site diagram 50 and makes the display device display the created site diagram 50. The site diagram display operation part 21 also receives an input such as an area specification and an area selection to the site diagram 50.

The use schedule view 60 is a so-called Gantt chart and displays a use period of each operation area within an entire work period, with a bar on a temporal axis. The use schedule bar display operation part 22 controls a display and an operation of the use schedule view 60. The use schedule bar 61 constituting the use schedule view 60 corresponds one-to-one to an operation area arranged on a site. The leftmost point of a bar represents a start date of use of an operation area. The rightmost point of a bar represents a finish date thereof. The use schedule bar display operation part 22 creates the use schedule bar 61 for all of the operation areas read from the area information storage part 41 and having already been arranged in the site, and makes the display device display the created use schedule bar 61. The use schedule bar display operation part 22 also receives an input such as a bar selection, into the use schedule view 60.

The date selection slider 70 is used for selecting a desired date by sliding a knob 72 from side to side on the date bar 71 which corresponds to the whole work period. The date selection slider display operation part 23 controls a display and an operation of the date selection slider 70. The date selection slider display operation part 23 also receives an input of any position selection on the date bar 71 using a mouse or an input of the knob 72 slide using the mouse; moves a position displayed by the knob 72; and obtains a date corresponding to the position displayed by the knob 72.

Figure 8:
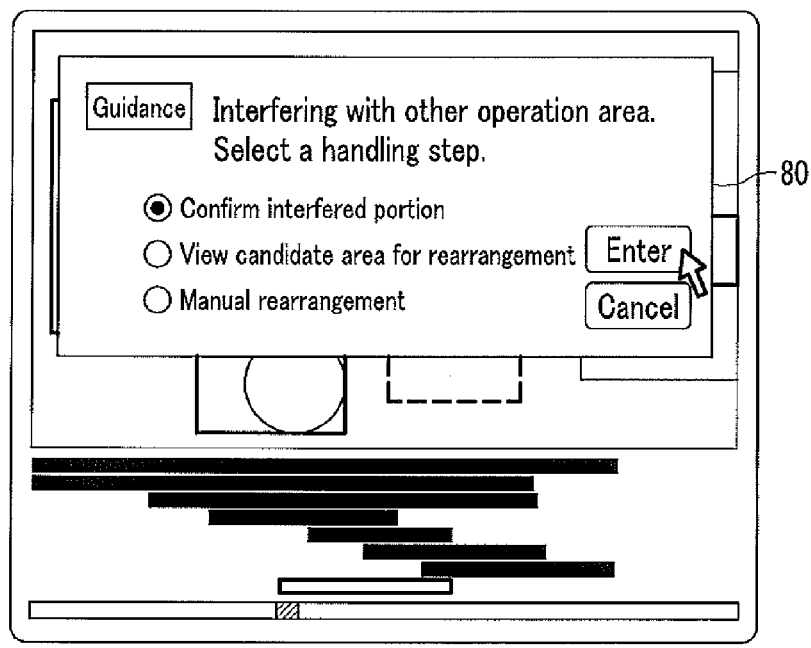
FIG. 8 is an example of a guidance message display in a case of interference with other operation area according to the first embodiment.
Figure 9:
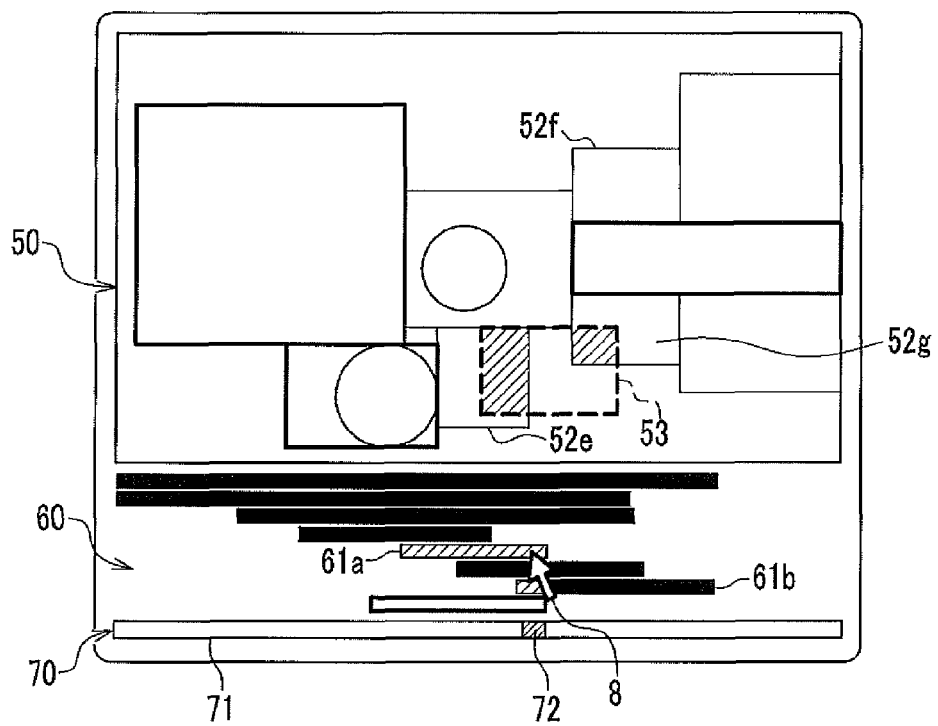
FIG. 9 is an example of an interference state detailed view screen according to the first embodiment.
Figure 10:
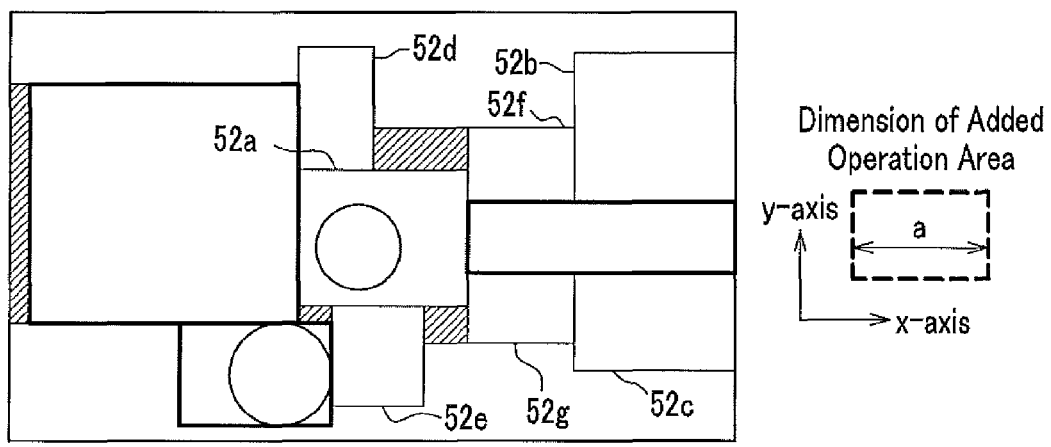
FIG. 10 is an explanatory diagram illustrating excluded areas by checking an area dimension in x-axis direction according to the first embodiment.
Figure 11:
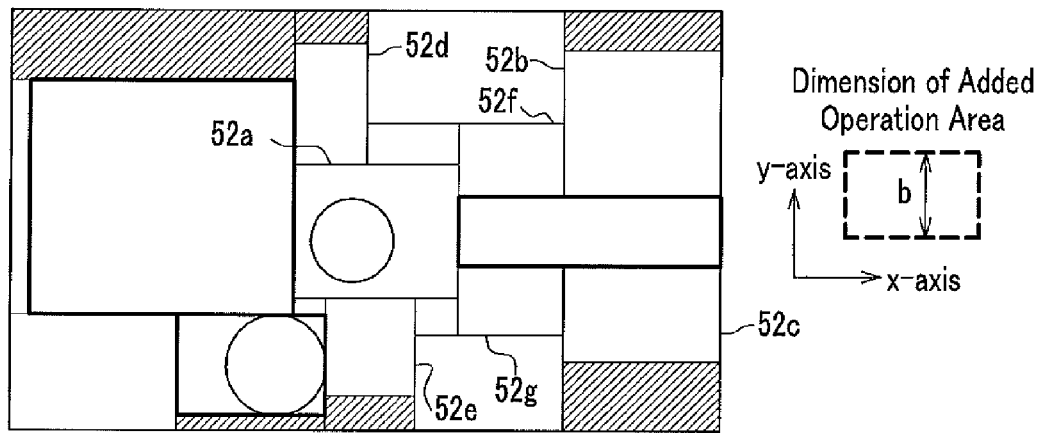
FIG. 11 is an explanatory diagram illustrating excluded areas by checking an area dimension in y-axis direction according to the first embodiment.

The guidance window display operation part 24 makes the display device display a guidance window 80 as shown in FIG. 8 where necessary and also receives an input to the guidance window 80.

The operation areas layout management part 30 makes the area information storage part 41 store therein information on all operation areas arranged in the site and references the information stored in the area information storage part 41, to thereby manage the operation areas.

The area information display part 31 reads registration information on a specified operation area from the area information storage part 41 and makes the display device display contents of the registration information in an output window not shown. The area information register part 32 obtains added registration information on an operation area which is inputted in an input window not shown and makes the area information storage part 41 store therein the added registration information together with a use period and an arranged position of the operation area. The added registration information on an operation area includes, for example, an identification name, an intended use, and a user's name of the operation area. The interference area detection part 33 references the registration information on the operation area stored in the area information storage part 41 and detects, if any, an operation area which causes an interference with the specified and added operation area.

The rearrangement processing execution part 34 performs a processing of an added operation area rearrangement, if the added operation area causes interference with other operation area. The rearrangement is made in one of the following two ways. One is that the rearrangement processing execution part 34 presents a candidate area for the rearrangement to a user and requests the user to select an appropriate candidate area. The other is that the rearrangement processing execution part 34 presents a range within which the rearrangement is possible to a user and requests the user to specify a position for the rearrangement. The rearrangement candidate area search part 341 references the registration information on the operation area stored in the area information storage part 41 and searches a candidate area for the rearrangement to be presented to the user in the former way. The rearrangement position acquisition part 342 references the registration information on the operation area stored in the area information storage part 41, detects a range within which the rearrangement is possible to be presented to the user in the latter way, and obtains a position for the rearrangement specified by the user.

The area information storage part 41 stores therein a position, a shape, a use start date, a use finish date, an identification name, an intended use, a user's name, and the like for each of all already-arranged operation areas. The site diagram information storage part 42 preliminarily stores therein diagram data on an entire construction location including a building and equipment placed therein.

Figure 2:
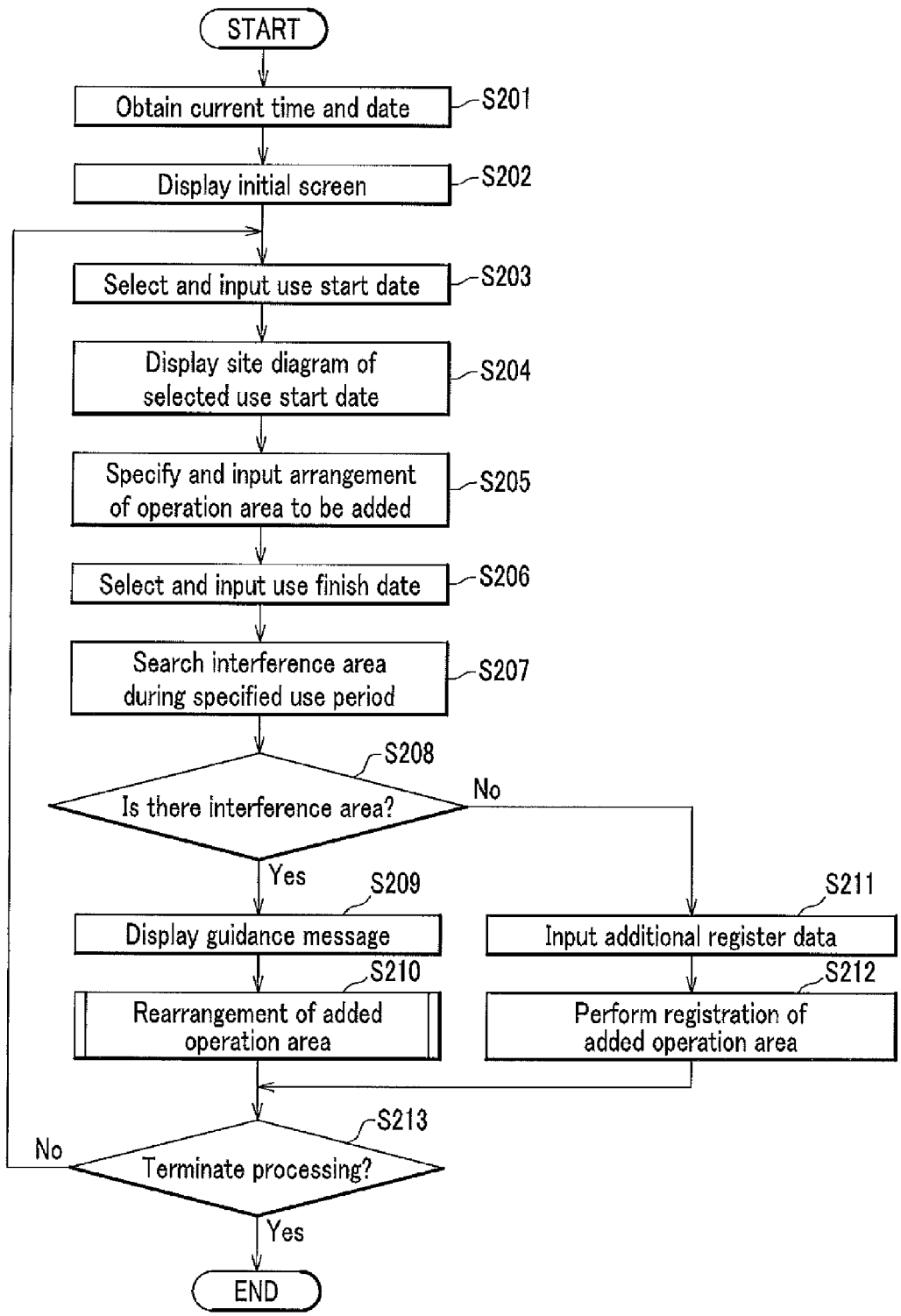
FIG. 2 is a flowchart illustrating a processing of an operation area addition according to the first embodiment.

Next are described in detail how the apparatus for supporting arrangement of operation areas layout 1 works for adding a new operation area to a site, with reference to FIG. 2 through FIG. 14. FIG. 2 is a flowchart illustrating a flow of a processing performed when an operation area is added, in the apparatus for supporting arrangement of operation areas layout 1.

The apparatus for supporting arrangement of operation areas layout 1 is started up, and a processing such as initialization of hardware is performed. Then, control is given to the operation areas layout arrangement processing part 10. In step S201, the operation areas layout arrangement processing part 10 obtains a current time and date from a built-in clock or the like not shown. In step S202, the operation areas layout arrangement processing part 10 instructs the input-output control part 20 to display an initial screen having a date corresponding to the obtained current time and date (that is, the current day). The input-output control part 20 instructs the site diagram display operation part 21, the use schedule bar display operation part 22, and the date selection slider display operation part 23 to make the display device display the site diagram 50, the use schedule view 60, and the date selection slider 70 of the current day, respectively (see FIG. 5).

In step S203, a user wants to add a new operation area (to be referred to as an "added operation area" hereinafter) and selects and inputs a use start date of the added operation area using the date selection slider 70. The input is performed by dragging a mouse from a position of the knob 72 displayed just under a mouse pointer 8 on the date selection slider 70 of FIG. 5 to, for example, a position of the knob 72 of FIG. 6 or by directly clicking the mouse on a desired position on the date bar 71. The input allows the selected use start date to be transferred from the date selection slider display operation part 23 to the operation areas layout arrangement processing part 10.

Figure 6:
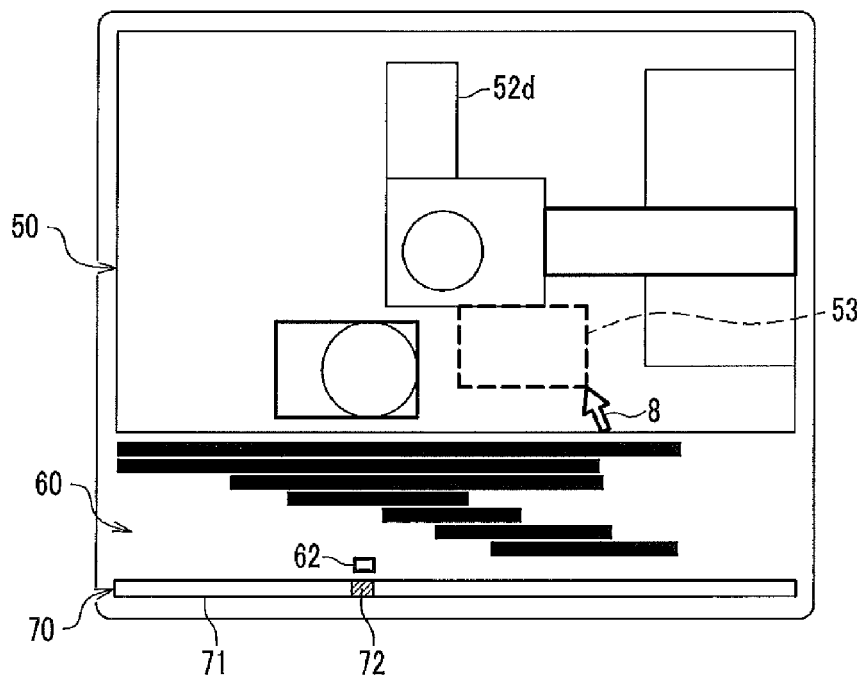
FIG. 6 is an example of arrangement specification of an added operation area according to the first embodiment.

In step S204, the operation areas layout arrangement processing part 10 instructs the input-output control part 20 to display the site diagram 50 corresponding to the obtained use start date. The input-output control part 20 instructs the site diagram display operation part 21 to make the display device display the site diagram 50 corresponding to the use start date as shown in FIG. 6. Note that the site diagram 50 of FIG. 6 additionally displays an operation area 52d on a portion which has been blank in FIG. 5, because the use start date of the added operation area is set at a date corresponding to the position of the knob 72.

In step S205, the user specifies and inputs where to arrange an operation area to be added, using the mouse, like the added operation area 53 shown in FIG. 6 with a dashed line. The input allows a data on a position and a shape of the specified added operation area 53 to be transferred from the site diagram display operation part 21 to the operation areas layout arrangement processing part 10.

Figure 7:
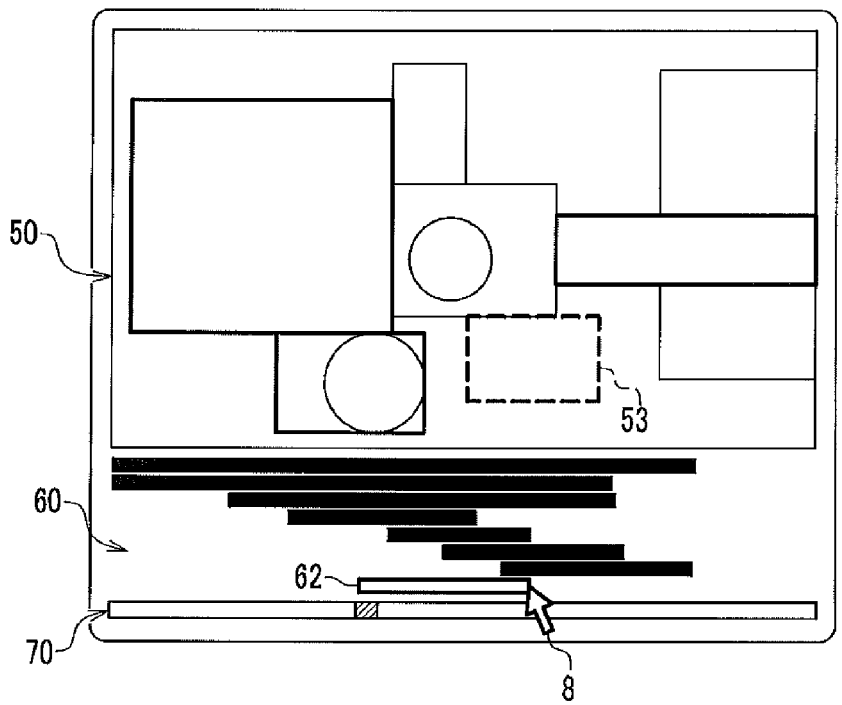
FIG. 7 is an example of a use finish date specification of an added operation area according to the first embodiment.

In step S206, the user selects and inputs a use finish date of the added operation area 53 by moving rightward a rightmost point of a use schedule bar 62 using the mouse, like the use schedule bar 62 drawn in outline on the use schedule view 60 of FIG. 7. The input allows the selected use finish date to be transferred from the use schedule bar display operation part 22 to the operation areas layout arrangement processing part 10.

In step S207, the operation areas layout arrangement processing part 10 instructs the operation areas layout management part 30 to search if there is an interference area which is a portion or all of an already-arranged operation area and causes interference with the added operation area 53 during the specified use period. The specified use period herein is a period between the use start date obtained in step S203 and the use finish date obtained in step S206.

If an interference area is detected and it is determined that there is interference (if "Yes" in step S208), in step S209, the operation areas layout arrangement processing part 10 instructs the input-output control part 20 to display a guidance message for a case of interference as shown in FIG. 8. In step S210, the operation areas layout arrangement processing part 10 makes the operation areas layout management part 30 execute the processing of the added operation area rearrangement by calling an area rearrangement subroutine. On the other hand, if an interference area is not detected, and it is not determined that there is interference (if "No" in step S208), in step S211, the operation areas layout arrangement processing part 10 requests the user to input an additional register data such as an identification name, an intended use, a user's name of the added operation area 53, using an input window not shown. In step S212, the operation areas layout arrangement processing part 10 transfers the inputted data to the operation areas layout management part 30 and makes the operation areas layout management part 30 perform a new registration of the added operation area 53.

In step S213, the operation areas layout arrangement processing part 10 determines whether or not the user has completed the processing. If it is determined that the user has completed the processing (if "Yes" in step S213), the processing is terminated. And, if not (if "No" in step S213), the processing returns to step S203 and repeats the above described steps.

Figure 3:
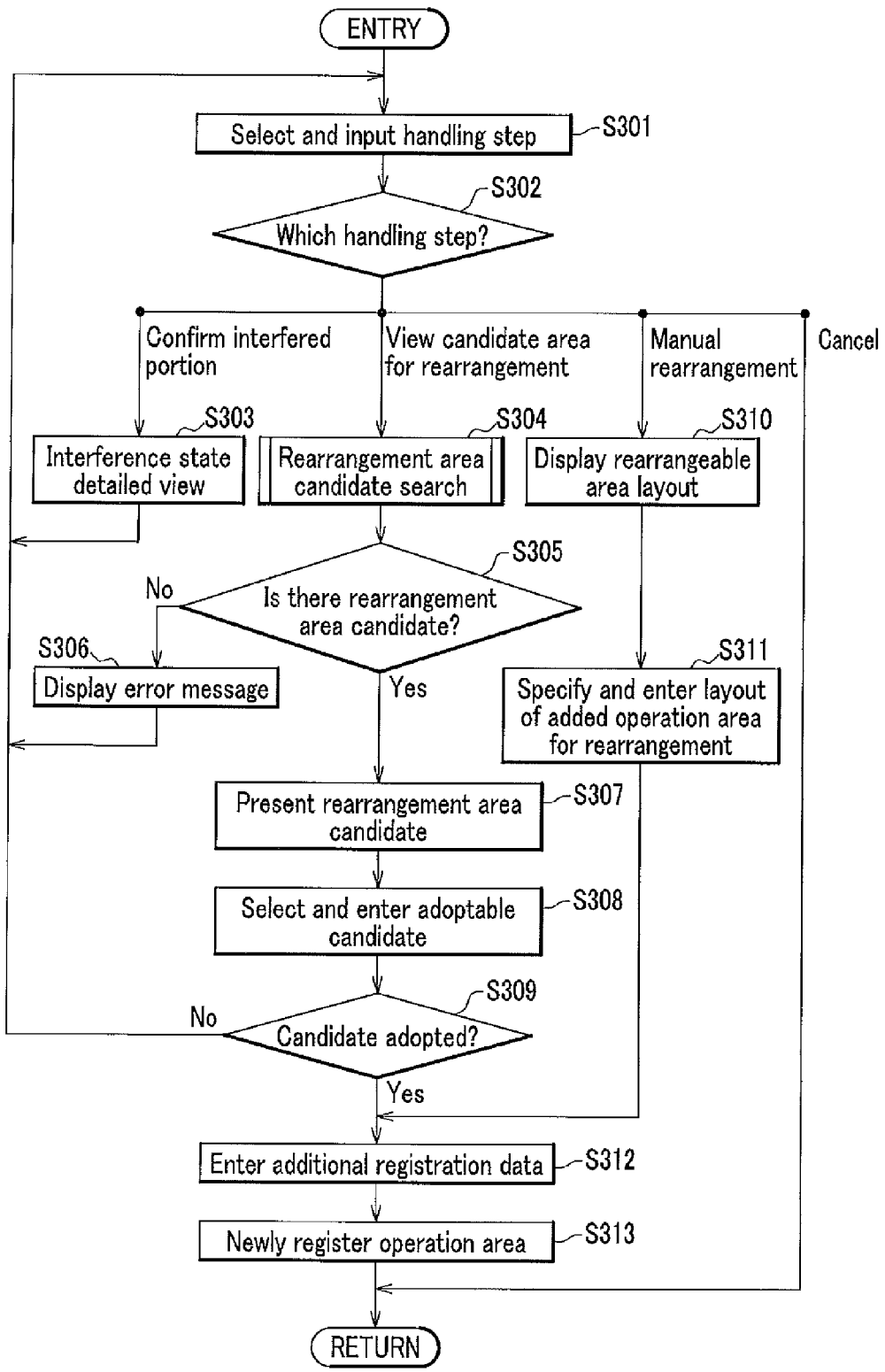
FIG. 3 is a flowchart illustrating a processing rearrangement of an added operation area subroutine according to the first embodiment.

Next is described in detail how an area rearrangement subroutine works, with reference to a flowchart of FIG. 3. The area rearrangement subroutine is called in step S210 of FIG. 2 and realizes a function of the rearrangement processing execution part 34.

When the area rearrangement subroutine is called, the display device has displayed a guidance message that there is interference as shown in FIG. 8 by the guidance window display operation part 24. The user selects one of three options for handling the interference displayed on the guidance window 80 and then clicks an "Enter" button with the mouse. In step S301 of FIG. 3, the one of the three options selected and entered by the user is transferred from the guidance window display operation part 24 to the rearrangement processing execution part 34.

In step S302, the rearrangement processing execution part 34 performs one of following four steps according to the obtained option.

If the obtained option for handling the interference is "Confirm interfered portion", the rearrangement processing execution part 34 proceeds the processing to step S303 and displays an interference state detailed view. In the interference state detailed view, as illustrated by an example of an interference state detailed view screen of FIG. 9, an interference period in an operation area in which the interference has occurred is identifiably displayed. For example, portions corresponding to interference periods on bars 61a, 61b in the use schedule view 60 are shaded. If the user selects any portion of the interference period with a mouse, an interference area is identifiably displayed on the site diagram 50 of an appropriate date corresponding to the selected position of the interference period (shaded portions in the added operation area 53).

If the obtained option is "View candidate area for rearrangement", the rearrangement processing execution part 34 advances the processing to step S304 and calls a rearrangement area candidate search subroutine, to thereby make the rearrangement candidate area search part 341 search a rearrangement area candidate. If there is no rearrangement area candidate (if "No" in step S305), the rearrangement processing execution part 34 makes the display device display an error message (step S306) and returns the processing to step S301. If there is a rearrangement area candidate (if "Yes" in step S305), the rearrangement processing execution part 34 presents the searched rearrangement area candidate to a user (step S307) and requests the user to select and enter an adoptable candidate, if any (step S308). If the user selects and enters an adoptable candidate (if "Yes" in step S309), the rearrangement processing execution part 34 requests the user to enter an additional registration data which is required for registration of an added operation area (step S312), newly registers an operation area of the adopted candidate (step S313), and returns control of the processing to the caller. If no candidate is adopted in step S308 (if "No" in step S309), the rearrangement processing execution part 34 returns the processing to S301.

Figure 14:
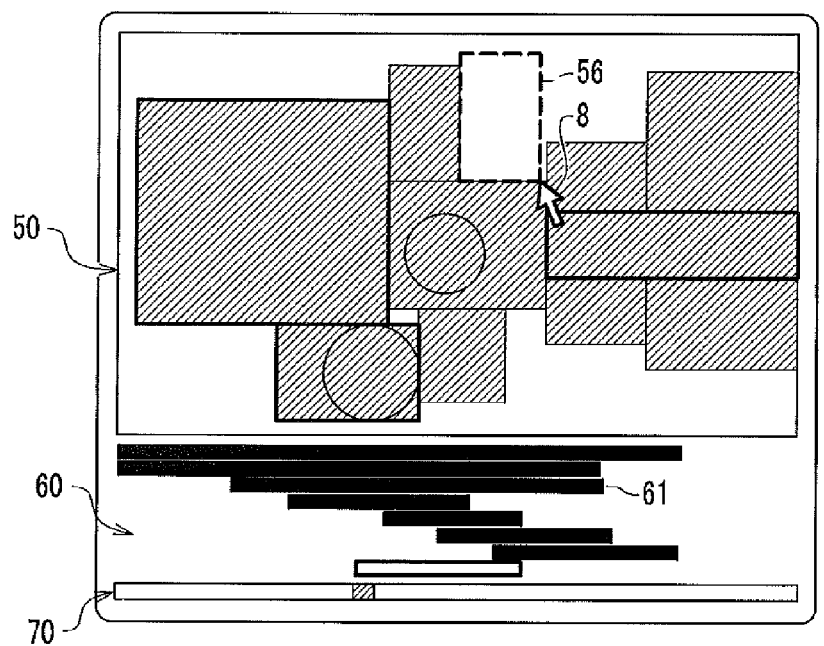
FIG. 14 is an example of a rearrangement area manual specification according to the first embodiment.

If the obtained option is "Manual rearrangement", the rearrangement processing execution part 34 advances the processing to step S310. As illustrated in FIG. 14 as an example, the rearrangement processing execution part 34 displays, on the site diagram 50, a rearrangeable area layout, that is, all areas which is not used during a specified use period (areas other than shaded portions in FIG. 14), receives an entry for specifying a layout of the added operation area 56 for the rearrangement (step S311); and performs a registration of the added operation area 56 received in and after step S312.

And, if a "Cancel" button of FIG. 8 is clicked, "Cancel" is obtained for handling the interference. The rearrangement processing execution part 34 returns control of the processing to the caller and terminates the processing.

Figure 4:
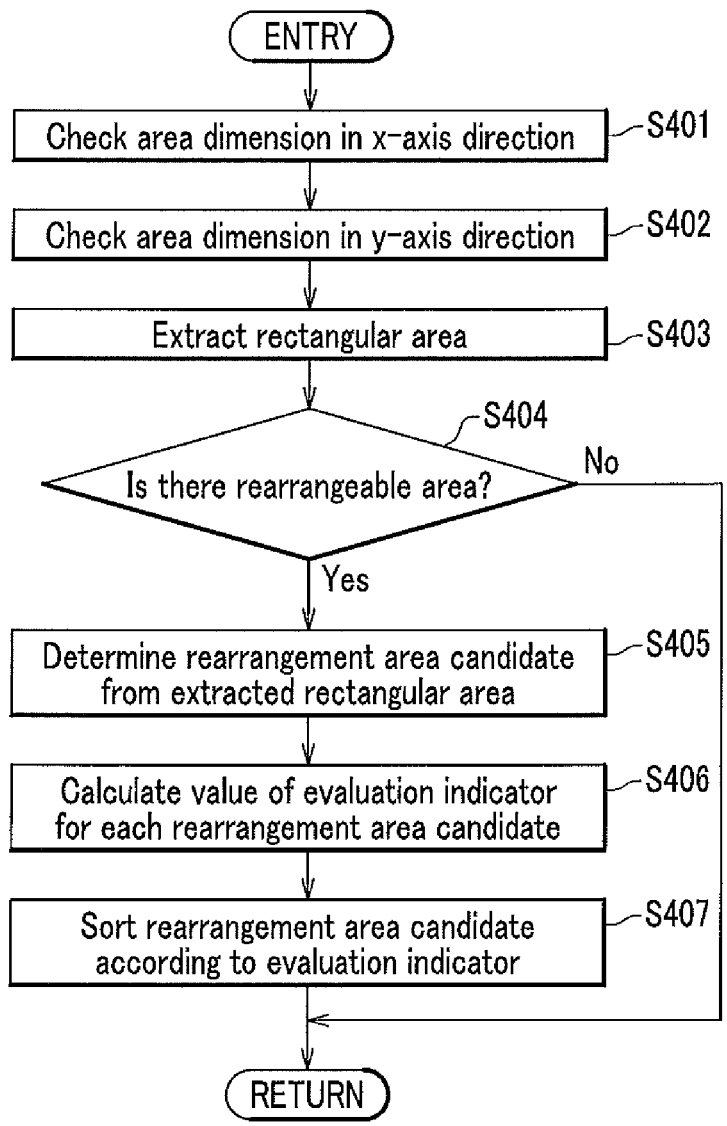
FIG. 4 is a flowchart illustrating a processing of a rearrangement area candidate search subroutine according to the first embodiment.

FIG. 4 is a flowchart illustrating how a rearrangement area candidate search subroutine works. The rearrangement area candidate search subroutine is called in step S304 of FIG. 3 and realizes functions of the rearrangement candidate area search part 341.

Figure 12:
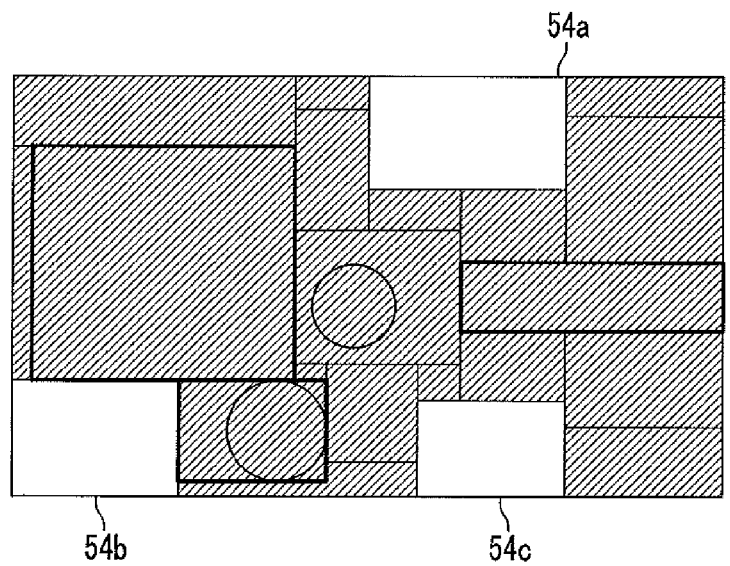
FIG. 12 is an explanatory diagram illustrating rectangular areas extracted as rearrangeable areas according to the first embodiment.

In step S401 to S403, upon the call of the rearrangement area candidate search subroutine, the rearrangement candidate area search part 341 extracts a rectangular area in which the added operation area is rearrangeable within the site. In step S401, a portion having a width smaller than a dimension "a" in a transverse direction (in an x-axis direction) of the specified added operation area 53 (see FIG. 6) (shaded portions in FIG. 10) is excluded from an area not in use within a specified use period (an area other than shaded portions in the site diagram 50 of FIG. 14). Similarly, in step S402, a portion having a vertical width smaller than a dimension "b" in a vertical direction (in a y-axis direction) of the added operation area 53 (see FIG. 6) (shaded portions in FIG. 11) is excluded therefrom. In step S403, as a result, three rectangular areas 54a, 54b, 54c as shown in FIG. 12 are extracted as rearrangeable areas for the added operation area 53.

If the rearrangement candidate area search part 341 determines that there is no rearrangeable area (if "No" in step S404), the rearrangement candidate area search part 341 returns control of the processing to the caller. If the rearrangement candidate area search part 341 determines that there is a rearrangeable area (if "Yes" in step S404), the rearrangement candidate area search part 341 determines and sorts a rearrangement candidate from the rectangular areas in steps S405 to S407.

Figure 13:
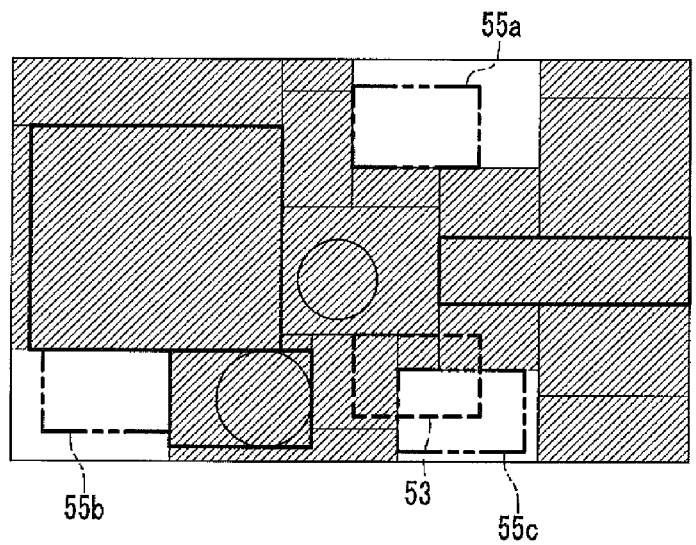
FIG. 13 is an explanatory diagram illustrating an example of rearrangement area candidate determination according to the first embodiment.

In step S405, the rearrangement candidate area search part 341 determines a layout position of the rearrangement area candidate from among the extracted rectangular area using a prescribed indicator. The evaluation indicator is, for example, a short distance from the specified added operation area 53. In this case, as shown in FIG. 13, areas 55a, 55b, 55c having the three shortest distances from the added operation area 53 from among the rectangular areas are determined as rearrangement area candidates. In S406, a value of the evaluation indicator for each rearrangement area candidate is calculated. In step S407, the rearrangement area candidates are sorted according to the calculated value of the evaluation indicator. The sorted result is transferred to the caller. And, the processing terminates. The sorted result, for example, that: the area 55c of FIG. 13 is the first candidate; the area 55a is the second; and the area 55b is the third, is transferred to the caller.

Note that description above has been made assuming a case where a new operation area is added and registered into the site. Similarly, it is possible in this embodiment to delete an already-arranged operation area, change a layout or a use period of an operation area, and reference or change registration information of an operation area.

As described above, the apparatus for supporting arrangement of operation areas layout 1 according to the first embodiment makes it possible to prevent interference of a layout or a use period between operation areas from occurring. This is because, if a user wants to register an operation area to be added in a site with a specified layout and use period, the apparatus for supporting arrangement of operation areas layout 1 automatically checks whether or not there is interference with other already-arranged operation area, and, if there is a possible interference, the layout of the added operation area is rearranged such that the interference is prevented from occurring.

<Second Embodiment>

The second embodiment describes that, if a new operation area to be added is used for temporarily placing an equipment to be carried in a building or for assembling them, a layout of the newly-added operation area is rearranged using an evaluation indicator regarding a carry-in operation by a crane.

Figure 15:
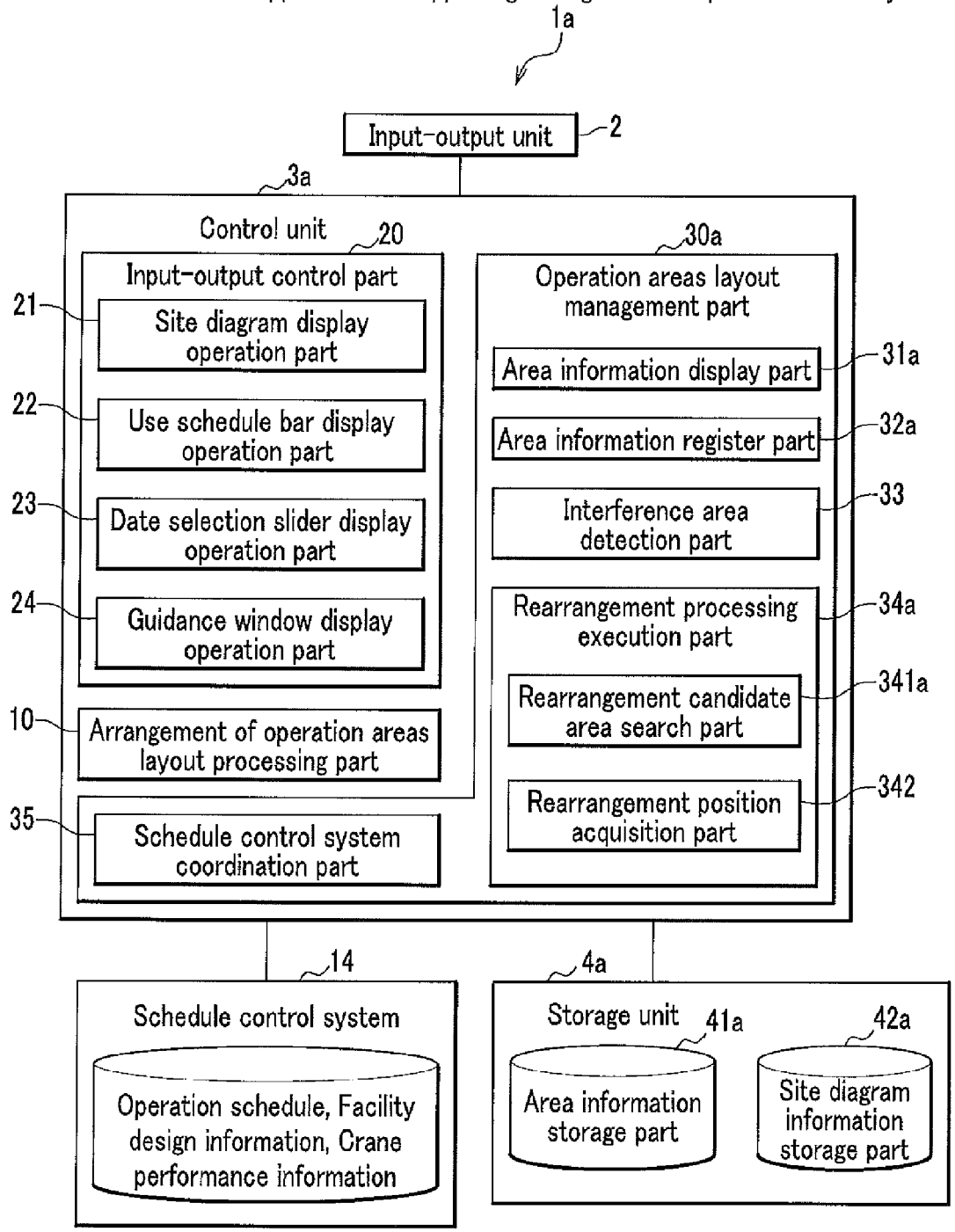
FIG. 15 is a functional block diagram illustrating a configuration of an apparatus for supporting arrangement of operation areas layout according to a second embodiment.

FIG. 15 is a functional block diagram illustrating a configuration of an apparatus for supporting arrangement of operation areas layout 1a according to the second embodiment. The apparatus for supporting arrangement of operation areas layout 1a according to the second embodiment includes a schedule control system coordination part 35. The schedule control system coordination part 35 performs coordination with the schedule control system 14 and is added to the operation areas layout management part 30 of the apparatus for supporting arrangement of operation areas layout 1 shown in FIG. 1 according to the first embodiment. Next are described components of the apparatus for supporting arrangement of operation areas layout 1a, focusing on a difference from those of the apparatus for supporting arrangement of operation areas layout 1 according to the first embodiment.

The schedule control system 14 is a computer system which controls an entire construction plan of a plant and holds an operation schedule such as a schedule for equipment installation, facility design information such as information on a position of installed equipment, and performance information on a crane used for a carry-in operation (a rated load, a rated speed, or the like). The schedule control system coordination part 35 of an operation areas layout management part 30a obtains the information held by the schedule control system 14 in response to a request from a rearrangement candidate area search part 341a or the like.

The area information storage part 41a stores therein identification information on a crane installed in each operation area or on an equipment temporarily placed and waiting for being carried-in as well as a period of the installment or of the temporal placement, based on the operation schedule obtained by the schedule control system coordination part 35. A site diagram information storage part 42a stores therein information on a crane used for a carry-in operation, a position of an installed or carried-in equipment, and a diagram data, based on the facility design information obtained by the schedule control system coordination part 35.

In determining and sorting the rearrangement area candidate in step S405 to step S407 of FIG. 4, a rearrangement candidate area search part 341a requests the schedule control system coordination part 35 to obtain various pieces of information necessary for calculating an evaluation indicator concerning a carry-in operation by a crane, from the schedule control system 14. The rearrangement candidate area search part 341a then calculates the evaluation indicator based on the obtained information.

A carry-in operation using a crane is performed by combining works such as hooking/unhooking, hoisting/lowering, boom raising/lowering, and swinging/traveling. Meanwhile, an operating time required for hooking/unhooking or hoisting/lowering is regarded as the same in any operation area, and thus, can be excluded from the calculation of the evaluation indicator.

Note that, the user is assumed to additionally input the identification information on the equipment temporarily placed in an added operation area, just after the user specifies and inputs an arrangement of the added operation area in step S205 of FIG. 2. The rearrangement candidate area search part 341a references the information.

Figure 16:
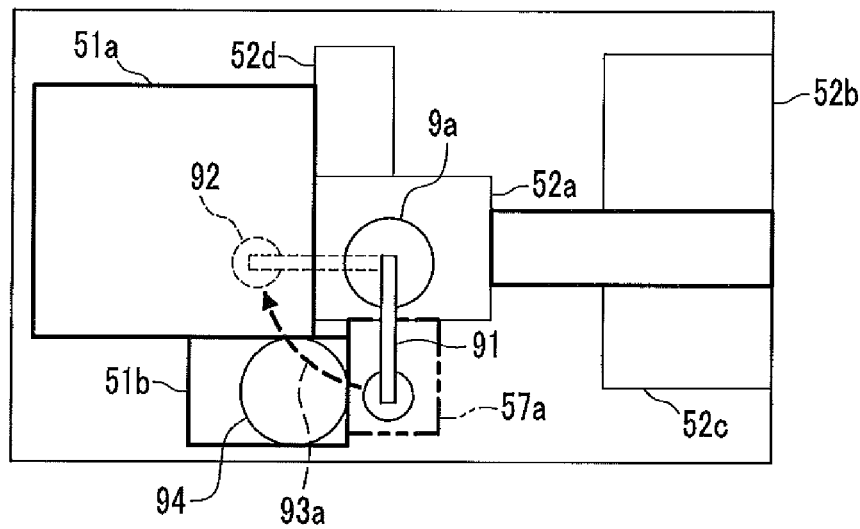
FIG. 16 is an explanatory diagram illustrating an example 1 of calculation of a carry-in operation time according to the second embodiment.
Figure 17:
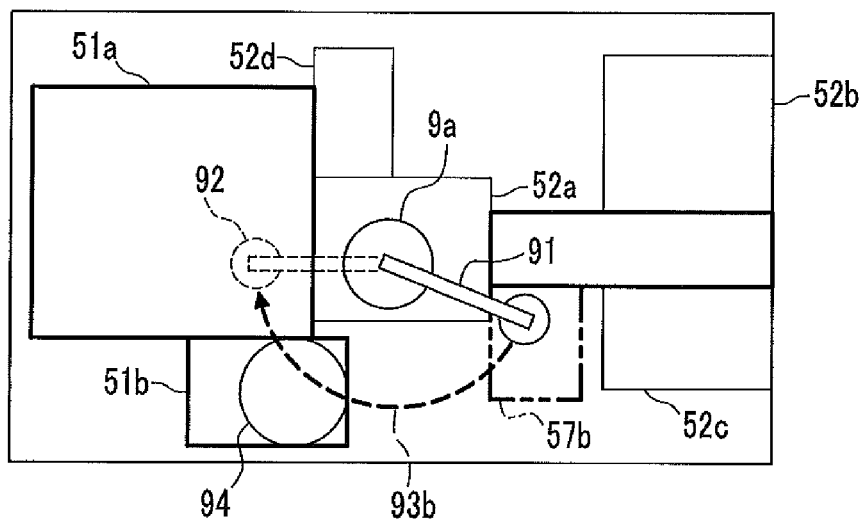
FIG. 17 is an explanatory diagram illustrating an example 2 of calculation of the carry-in operation time according to the second embodiment.

If a mass of an equipment to be carried-in is small and a rated load of a crane depending on a boom angle is thus not a problem, an evaluation indicator can be used that a time required for a carry-in operation taking into account a swing motion of the crane is short. FIG. 16 and FIG. 17 are explanatory diagrams for comparing respective carry-in operation times of an equipment to be carried-in 92. The equipment to be carried-in 92 is temporarily placed in the fixed area 51a using a stationary crane 9a installed in the operation area 52a. A layout of an added operation area of the equipment to be carried-in 92 is rearranged. If a boom angle of a boom 91 of the stationary crane 9a is unchanged, the added operation area can be rearranged in any position between a rectangular area 57a of FIG. 16 and a rectangular area 57b of FIG. 17. However, a swing degree of a carry-in route 93a is the smallest from the rectangular area 57a. Thus, the carry-in operation time from the rectangular area 57a is calculated to be the shortest.

Figure 18:
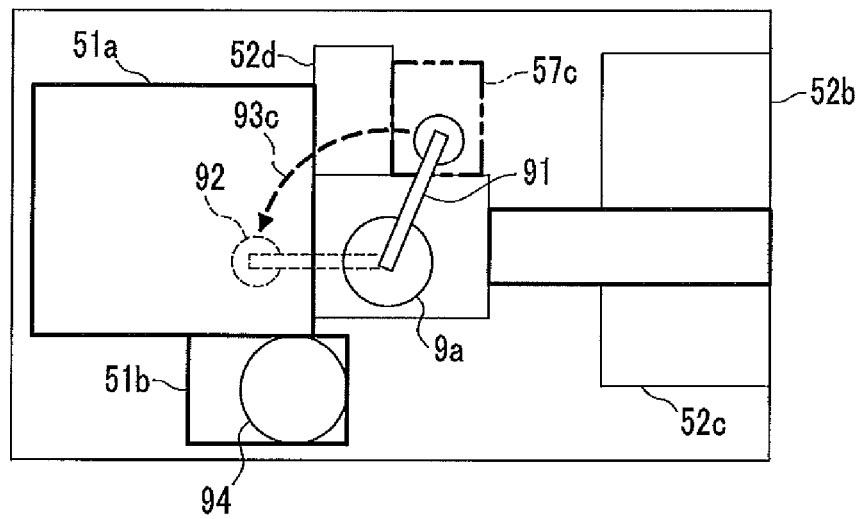
FIG. 18 is an explanatory diagram illustrating an example 3 of calculation of the carry-in operation time according to the second embodiment.

The calculation above has been made assuming that there is no restriction on a carry-in route. Some plants, however, prohibit a carry-in operation in which a carry-in route of an equipment passes through over an existing equipment. In this case, the carry-in route 93a of FIG. 16 and a carry-in route 93b of FIG. 17 both of which pass through over an existing equipment 94 cannot be selected. It is therefore necessary for a swing direction of a crane to be changed counterclockwise. As a result, a swing degree of a carry-in route 93c from a position of a rectangular area 57c of FIG. 18 becomes the smallest. The carry-in operation time from the rectangular area 57c is therefore calculated to be the shortest.

Figure 19:
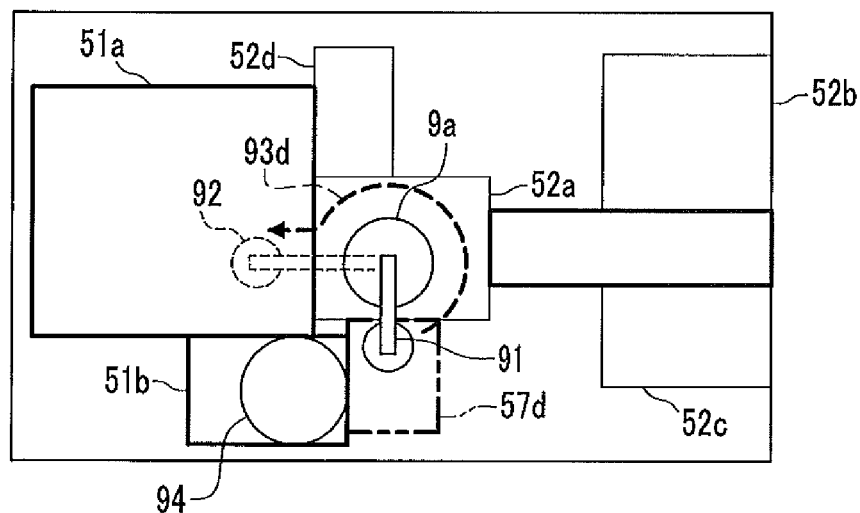
FIG. 19 is an explanatory diagram illustrating an example of calculation of a hooking margin according to the second embodiment.

If the mass of an equipment to be carried-in is large, and the mass exceeds a rated load of a crane depending on a boom angle, another evaluation indicator can be used that a hooking margin of a crane is larger. The hooking margin of a crane used herein is a value calculated by subtracting a mass of a carried-in equipment from a rated load of the crane on a boom degree basis and dividing the resultant difference by the rated load. For example, if the rated load is 100 tons and the mass of a carried-in equipment is 70 tons, the hooking margin is 0.3. The larger the boom angle (that is, the nearer to the vertical), the larger the hooking margin. For example, compare the stationary crane 9a shown in FIG. 16 through FIG. 19. A rectangular area 57d in FIG. 19 has the shortest boom 91 when viewed from above. A position of the rectangular area 57d has thus the largest boom angle, and a hooking margin thereof is calculated to be the largest.

Figure 20:
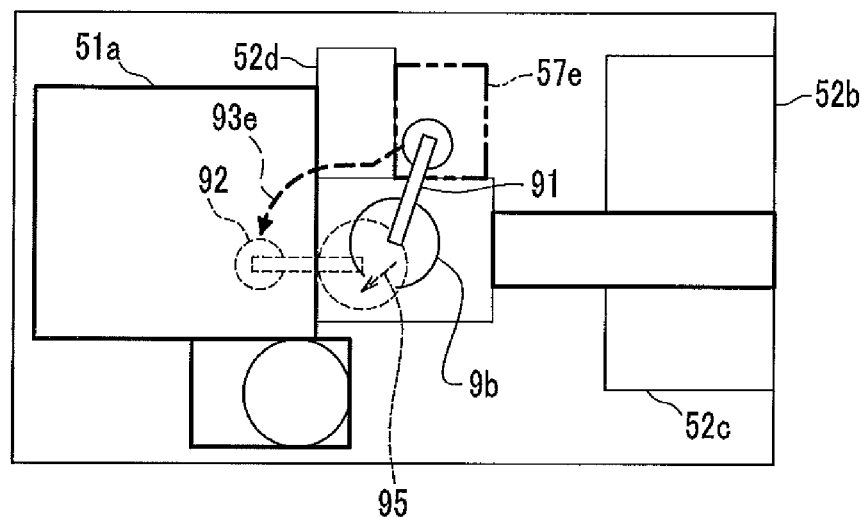
FIG. 20 is an explanatory diagram illustrating an example 1 of calculation of a travel distance of a crane according to the second embodiment.
Figure 21:
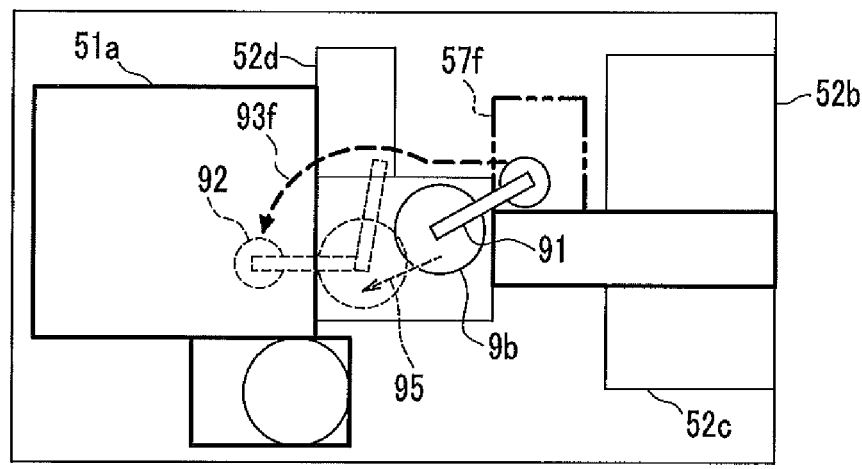
FIG. 21 is an explanatory diagram illustrating an example 2 of calculation of the travel distance of a crane according to the second embodiment.

If a fixed crane is used for a carry-in operation, an evaluation indicator can be a smaller travel distance of the crane. This is based on that a travel of a crane with a heavy load hanging down therefrom is dangerous and that a ground in a range of the travel needs to be reinforced. For example, compare FIG. 20 with FIG. 21. A travel distance 95 of a mobile crane 9b from a rectangular area 57e to the fixed area 51a of FIG. 20 is calculated to be smaller than that from a rectangular area 57f to the fixed area 51a of FIG. 21.

Note that the aforementioned evaluation indicators concerning a carry-in operation using a crane can be used not separately but in combination by multiplying respective values of the evaluation indicator by a prescribed weight and summing up the resultant products.

As described above, the apparatus for supporting arrangement of operation areas layout 1a according to the second embodiment makes it possible to control operation areas taking into account an efficiency of a carry-in operation using a crane. This is because, if a user wants to register a new operation area in a site and finds that there is interference between the operation area to be added and an already-arranged operation area, a candidate rearrangement area is determined based on an evaluation indicator concerning the carry-in operation using a crane.

In the present invention, interference between operation areas can be prevented from occurring in arranging an operation areas layout when a plant construction plan is designed and updated.

The site diagram outputted in the apparatus for supporting arrangement of operation areas layout of the present invention can also be utilized for presenting a plant construction plan or its progress situation to a client.

The embodiments according to the present invention have been explained as aforementioned. However, the embodiments of the present invention are not limited to those explanations, and those skilled in the art ascertain the essential characteristics of the present invention and can make the various modifications and variations to the present invention to adapt it to various usages and conditions without departing from the spirit and scope of the claims.

The invention claimed is:

1. An apparatus for supporting arrangement of construction-site operation areas layout which supports a construction-site operation areas arrangement planning in which two or more construction-site operation areas having respective use periods different from each other are arranged in a prescribed site, comprising:
    a storage unit configured to store therein data on a position, a shape, and a use period of each construction-site operation area which has been arranged in the prescribed site;
    a display control unit configured to reference the data stored in the storage unit, make a display unit display a top view illustrating arrangement of the construction-site operation areas at a given point of time on a temporal axis; and
    a construction-site operation areas layout arrangement processing unit configured to receive an input of a data on a position, a shape, and a use period of a first construction-site operation area which is to be additionally arranged in the prescribed site, reference the data stored in the storage unit, and, if the construction-site operation areas layout arrangement processing unit determines that the e is no interference of the first added construction-site operation area of which data has been received, h a second construction-site operation area which has been already arranged in the prescribed site, store the data on the first added construction-site operation area in the storage unit;
    wherein, if the construction-site operation areas layout arrangement processing unit determines that the received first added construction-site operation area interferes with the second already-arranged construction-site operation area, the construction-site operation areas layout arrangement processing unit is configured to search a third area as a rearrangement candidate construction-site operation area in which the first added construction-site operation area is rearrangeable from among on fourth area to which no operation allocated during use period of the first added construction-site operation area base on a prescribed evaluation indicator;
    a schedule control system coordination unit configured to obtain a final carry-in position of an equipment after being temporarily placed in the first added construction-site operation area, an installment position of a crane which is used for carrying in the equipment into the final carry-in position, and performance information on the crane, from a schedule control system for controlling an operation schedule in the prescribed site,
    wherein the evaluation indicator used by the construction-site operation areas layout arrangement processing unit is that a carry-in operation time in which the crane carries in the equipment from the position of the third rearrangement candidate construction-site operation area to the final carry-in position of the equipment temporarily placed in the first added construction-site operation area, is short.

2. The apparatus for supporting arrangement of construction-site operation areas layout according to claim 1,
    wherein, if the construction-site operation areas layout arrangement processing unit determines that there is interference of the received first added construction-site operation area with the second already-arranged construction-site operation area, the construction-site operation areas layout arrangement processing unit is configured to search an interference construction-site operation area which is a portion or all of the second already-arranged construction-site operation area and which interferes with the first added construction-site operation area, and wherein the display control unit is configured to make the display unit identifiably display the interference construction-site operation area on a top view of the prescribed site.

3. The apparatus for supporting arrangement of construction-site operation areas layout according to claim 1, wherein the display control unit is configured to:

make the display unit display, with a bar, a use period of the second already-arranged construction-site operation area together with the top view of the prescribed site, if the construction-site operation areas layout arrangement processing unit determines that the received first added construction-site operation area interferes with the second already-arranged construction-site operation area, make the display unit identifiably display a period during which the first construction-site operation area interferes with the second construction-site operation area, on a bar representing the use period of the second construction-site operation area, and if one period during which the first construction-site operation area interferes with the second construction-site operation area is selected or inputted, make the display unit display a top view of the prescribed site illustrating a construction-site operation areas layout in the selected or inputted period.

4. The apparatus for supporting arrangement of construction-site operation areas layout according to claim 1, wherein the prescribed evaluation indicator used by the construction-site operation areas layout arrangement processing unit is that a distance between a position of the received first added construction-site operation area and a position of the third rearrangement candidate construction-site operation area, is short.

5. The apparatus for supporting arrangement of construction-site operation areas layout according to claim 1, wherein the schedule control system coordination unit is configured to obtain an installment position of an existing equipment from the schedule control system, and wherein the construction-site operation areas layout arrangement processing unit is configured to search the position of the third rearrangement candidate construction-site operation area into which the first added construction-site operation area is rearrangeable under restriction that the temporarily placed equipment does not passes through over the existing equipment.

6. The apparatus for supporting arrangement of construction-site operation areas layout according to claim 1, wherein the schedule control system coordination unit is configured to obtain a mass of the equipment temporarily placed in the first added construction-site operation area, and wherein the prescribed evaluation indicator used by the construction-site operation areas layout arrangement processing unit is that a hooking margin of the crane which is a margin of a heavy load hook and is calculated by using the mass of the temporarily placed equipment and a rated load of the crane is large.

7. The apparatus for supporting arrangement of construction-site operation areas layout according to claim 1, wherein the schedule control system coordination unit is configured to obtain a mass of the equipment temporarily placed in the first added construction-site operation area, and wherein the prescribed evaluation indicator used by the construction-site operation areas layout arrangement processing unit is that a travel distance of the crane which is a margin of a heavy load hook and is calculated by using the mass of the temporarily placed equipment and a rated load of the crane, is small.

* * * * *